United States Patent Office

3,042,549
Patented July 3, 1962

3,042,549
SILICONE TREATED COTTON
Ralph A. Arnold, 911 Urban Ave., Durham, N.C., and Joseph M. Gidding, 985 Lexington Ave., New York, N.Y.
No Drawing. Filed Nov. 4, 1958, Ser. No. 771,723
3 Claims. (Cl. 117—140)

Our invention relates to the production of a water repellent product for the protection of wounds, abscesses, medicated areas and exposed sensitive portions of the human body. The need for such a product is widespread and has existed for a long time as may be appreciated for example by considering the extreme difficulty encountered during World War II in humid tropical areas in treating infections. Thus it was extraordinarily difficult to eradicate bacterial infections of the ear or nose, by way of illustration, because the absorbent cotton used to apply medication and protect the infected part soaked up moisture from the environment and created a favorable medium for bacterial life.

We have discovered that it is possible to treat absorbent cotton (U.S.P.) with a small amount of a silicone polymer so as to markedly improve water repellency without deterioration of the normal, desirable properties of the fibrous product. In addition, the feel of the cotton is improved, and the batting pulls apart more easily because of the lubricity of the silicone polymer on the cotton fibers.

Our invention will be illustrated by examples of silicone treated cotton prepared by treating U.S.P. absorbent cotton with low molecular weight liquids comprising mixtures of lower alkyl siloxanes and impregnating the fibers by forming alkyl polysiloxane resins in situ. In the first example, the cotton was treated with Dow Corning 104 Emulsion and XEY 21 catalyst. In the second example, the cotton was treated with Dow Corning ET-5317 and the same catalyst used in the first example. In the third example, the cotton was treated with the Dow Corning 105 Emulsion and Dow Corning 105 B Catalyst. In each example, the silicones were padded on from the emulsion products. The samples then were dried at 250° F. and cured at 300° F. for 15 minutes. The finished products contained 1.5% silicone solids by weight.

In the above examples, typical commercially available products containing partially polymerized silicones of relatively low molecular weight, obtainable, for example, from dimethyldichlorosilane by hydrolysis using heat and/or an acidic catalyst, e.g. aqueous hydrochloric acid, were employed in emulsion form. The resins, thermosetting or hydrolytic, also can be applied in solution, e.g. an aromatic solvent such as toluene. The silicone oils were further polymerized in situ as by hydrolysis under more severe conditions with an acidic or basic catalyst or air oxidation to obtain silicone resins of relatively high molecular weight. The composition of the particular silicones and varying means for producing polymers in suitable form for impregnation of the cotton fibers are well known to chemists (see for example U.S. Patents 2,258,218, and 2,438,478 and J.A.C.S., vol. 63, 798 and 1194, 1941) and form no part of the present invention which relates to the silicone coated or impregnated product and is not dependent on particulars of silicone chemistry. Obviously, however, care should be taken to avoid use of materials which might leave toxic residues in the fibrous cotton batting.

Structurally, as is well known, the silicones represent the combination of the following molecular elements in which R is usually a lower alkyl of say one to six carbon atoms, most advantageously, methyl, but may be alkylaryl:

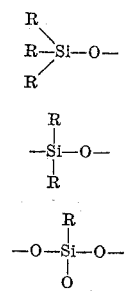

The silicone resins may be built up through condensation of various silicon containing materials such as substituted silicones, silicols, alkylated derivatives of silicon tetrachloride, etc., with hydroxy compounds in a manner resulting in high molecular weight chains and cross linked structures of high molecular weight. The methyl silicones in general are easiest to make, and most suitable from the stand-point of our invention. The $CH_3/Si$ ratio therein ordinarily is less than 2 because of extensive cross linking, as is generally known to silicone chemists. The relative proportion of silicone treating agent to cotton may vary considerably, but usually will be in the range of about 0.01 to 10 percent by weight, preferably 0.05 to 0.25.

We claim:
1. As an article of manufacture fibrous absorbent cotton U.S.P. impregnated with 0.01 to 10 percent by weight of a silicone polymer whereby the water repellency of the article is improved.
2. The product of claim 1 wherein the ratio of silicone is about 0.05 to 0.25 percent by weight.
3. The product of claim 1 wherein the silicone is a methylpolysiloxane resin formed in situ.

References Cited in the file of this patent
UNITED STATES PATENTS

| 2,443,512 | Powers | June 15, 1948 |
| 2,807,601 | Dennett | Sept. 24, 1957 |
| 2,859,137 | Ellis | Nov. 4, 1958 |
| 2,899,337 | Bird et al. | Aug. 11, 1959 |
| 3,006,338 | Davies | Oct. 31, 1961 |

FOREIGN PATENTS

| 448,164 | Great Britain | June 3, 1936 |